July 28, 1936.
R. F. ELY, JR
2,049,253
AUXILIARY SUPERCHARGER AND SUPERCOMPRESSOR IGNITION HIGH SPEED DIESEL ENGINE
Filed May 22, 1934
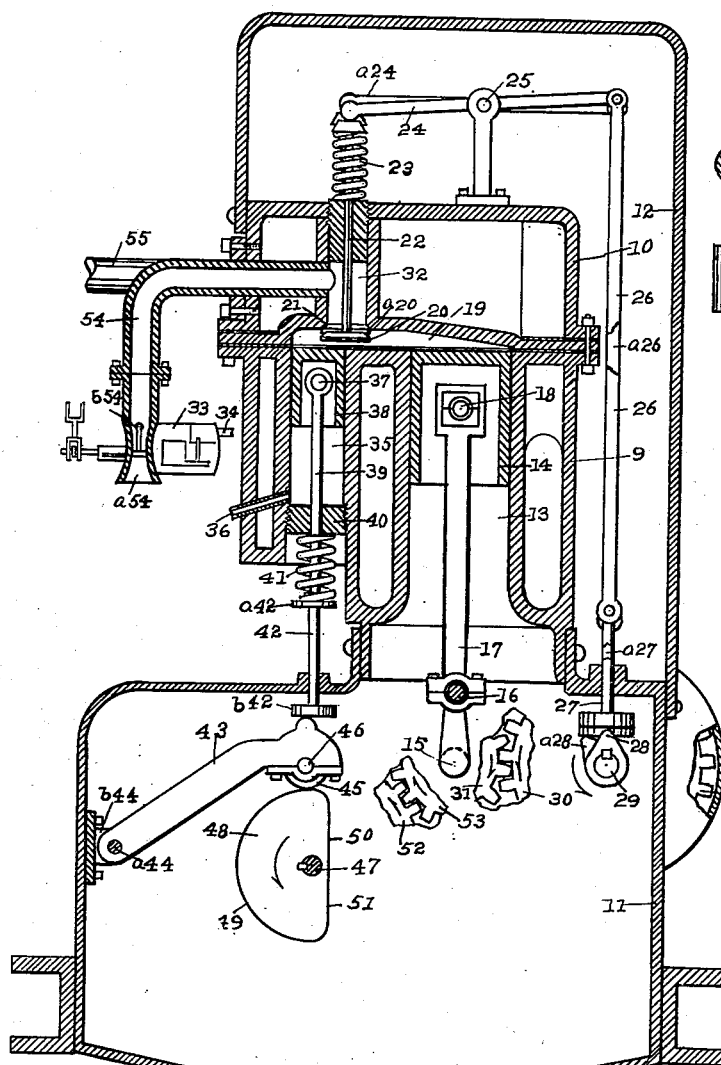
INVENTOR.
Robert F. Ely, Jr.
BY David E. Lain,
ATTORNEY.

Patented July 28, 1936

2,049,253

UNITED STATES PATENT OFFICE 2,049,253

AUXILIARY SUPERCHARGER AND SUPER-COMPRESSOR IGNITION HIGH SPEED DIESEL ENGINE

Robert F. Ely, Jr., Bellingham, Wash.

Application May 22, 1934, Serial No. 726,948

3 Claims. (Cl. 123—143)

My invention relates to improvements in auxiliary supercharger and compression-ignition, high-speed, Diesel engines, and has for an object to provide an auxiliary cylinder and piston for supercharging and firing by compression in cooperation with the main cylinder and piston.

Another object of my improvement is to join the open upper ends of the main and auxiliary cylinders by the unrestricted compression and firing chamber.

Another object of my improvement is to provide cooperative movements of the main and auxiliary pistons which preclude firing the charges by the main piston movements alone and confines the firing to the up movement of the auxiliary piston and the latter part of the up movement of the main piston, thus intensifying the means for atomizing the charge and supplementing the carburetter in the preparation of the same and delaying a firing pressure till provided and timed by the auxiliary piston.

Another object of my improvement is to provide an auxiliary cylinder having sufficient capacity to ignite the fuel charge by compression by forcing that part of the fuel charge in the auxiliary cylinder into the compression and firing chamber following compression by the main piston.

Other objects of my invention will appear as the description proceeds.

I attain these and other objects of my improvement with the mechanism illustrated in the accompanying sheet of drawings, which forms a part of this specification, in which Figure 1 is a side elevation, in section on a vertical plane, of my one cylinder engine, Fig. 2 is a segregated side elevation of the cam wheel arm, in longitudinal vertical section, Fig. 3 is a bottom plan view of Fig. 2, Fig. 4 is a side elevation of the cam wheel shown alone, Fig. 5 is a diagram of the piston locations at the intake stage of piston operation, Fig. 6 is a diagram of the piston locations at the compression stage, Fig. 7 is a diagram of the piston locations at the power stage, Fig. 8 is a diagram of the piston locations at the exhaust stage of piston operation, the diagrams also show the related intake and exhaust valve positions at each of the said piston locations, and Fig. 9 is a fragmentary side elevation of the intake and exhaust valves.

Similar characters refer to similar parts throughout the several views. Certain parts are broken away to show other parts hidden thereby.

With more particular reference to the designated parts: The engine block 9 has the head block 10, the crank case 11, the housing 12, the main cylinder 13, the main piston 14, the engine shaft 15, the engine crank 16, the main connecting rod 17, the main piston pin 18, the compression chamber 19, the intake valve 20, the intake valve seat 21, the exhaust valve a20, the exhaust valve seat a21, the intake valve stem 22, the exhaust valve stem a22, the intake valve spring 23, the exhaust valve spring a23, the intake valve walking beam 24, the walking beam bearing 25, the intake valve walking-beam rod 26, the intake valve cam rod 27, the intake valve cam 28, the intake valve and exhaust valve cam shaft 29, the exhaust-valve, walking-beam rod a26, the valve cam gear 30 fastened on the cam shaft 29 engaged with the driving valve gear 31 which is fastened on the engine shaft 15. Another driving gear 53 is fastened on the engine shaft and engages with the gear 52 which is fastened on the auxiliary cam shaft 47. These three shafts are parallel and the said gears connecting the same are proportioned to provide that, with the engine shaft 15 revolving clockwise, the cam shaft 29 is revolved counterclockwise at one-half the rate of the engine shaft and also the auxiliary cam shaft 47 is revolved counterclockwise at one-half the rate of the engine shaft.

The valve cam rod 27 is mounted for vertical reciprocation with its upper end pivoted to the lower end of the intake valve walking-beam rod 26 and its lower end disposed to bear on the intake cam 28 providing for one complete opening and closing of the intake valve 20 for each revolution of the valve cam shaft 29. Another cam rod a27 is disposed behind the cam rod 27 in Fig. 1, is similar thereto, is also mounted for vertical reciprocation with its upper end pivoted to the walking-beam rod a26 and its lower end bearing on the valve cam a28 providing for one complete opening and closing of the exhaust valve a20 for each complete revolution of the valve cam shaft 29. The said three shafts 15, 29 and 47 are mounted for revolution in bearings in the gear and crank case 11 and on the auxiliary cam shaft 47 is fastened the auxiliary-piston cam 48 to revolve therewith.

The auxiliary cylinder 35 is preferably disposed adjacent the main cylinder 13 and parallel therewith. Both the main and auxiliary cylinders are connected conduit-wise at their outer ends for free atomized fuel and gas communication through the compression and firing chamber 19. The lower end of the main cylinder 13 is open and communicates with the crank and gear case chamber, but the lower end of the auxiliary cylinder 35 is operatively closed except for the breathing opening 36. The auxiliary piston 38 is mounted for reciprocation in the cylinder 35 and has the piston pin 37 to which the upper end of the piston rod 39 is pivoted. The lower end of the auxiliary piston rod 39 is extended through a vertical bearing for reciprocation in the nut 40 which is engaged in the threaded lower end of the cylinder 35. The auxiliary cam rod 42 is mounted for reciprocation in a bearing in the engine frame in the axis of the cylinder 35, is engaged with the lower end of the rod 39 and has the flange $a42$ on its upper end. The auxiliary piston spring 41 is mounted on the protruding lower end of the auxiliary piston rod 39 for reaction between the bottom of the bearing nut 40 and the top flange $a42$ on the cam rod 42.

The cam wheel arm 43 has the bearing 44 on one end thereof for mounting on the pin $a44$ in the frame bracket $b44$ for oscillation. On the other end of the arm 43 are the capped bearings $a43$ in which are mounted the gudgeons 46, 46 of the cam wheel 45. Preferably, the wheel axis, the axis of the shaft 47 and the cam rod 42 are substantially aligned. The bottom end of the cam rod 42 has a flange which is disposed to bear on top of the arm 43 above the wheel 45. The cam disc 48 has the semicircular surface 49 and the two aligned, flat surfaces 50 and 51. The cams 49, 50 and 51 are related to the valve cams 28 and $a28$ about as illustrated. The cam shafts 29 and 47 are driven continuously by the engine shaft 15 at one-half the rate thereof. For each complete revolution of the cam shaft 47 the auxiliary piston 38 makes one complete up and down reciprocation in the auxiliary cylinder 35.

The valves 20 and $a20$ are operated by the cams 28 and $a28$ respectively, in the usual way for this type of engine.

The wheel 45 bears and rolls on the cam surfaces of the cam disc 48 as the shaft 47 revolves the disc which, in cooperation with the spring 41, determines the movements of the auxiliary piston 38 in the cylinder 35. During a half revolution of the disc the wheel bears on the semicircular cam 49 and retains the auxiliary piston at the top of its stroke, as shown in Figs. 1, 5, and 8. During the next one-fourth revolution the auxiliary piston abruptly descends to its low position shown in Fig. 6, and during the final one-fourth of the said shaft revolution the auxiliary piston 38 quickly rises to its top position shown in Figs. 1, 5, and 8. Diagrammatic Fig. 7 shows the engine crank within about 30° of top center while the cam 48 is within about 15° of its top center with cam wheel 45 bearing on the surface 51 near the surface 49 and having forced piston 38 close to its upper limit.

The intake valve 20 opens and closes the inlet duct 32 which communicates with the intake pipe 54 connected with the carburetter 33. The carburetter has the pipe 34 connected with a source of gasoline or oil supply. The air duct 54, $a54$ remains fully open and the fuel control $b54$ determines the rate of flow of fuel from the carburetter into the air duct 54 thus engine power is controlled.

The related pistons and valves are shown at the intake cycle of operation in Figs. 1 and 5, both pistons being at top center, the intake valve 20 open and the exhaust valve $a20$ closed and the cam wheel 45 bearing on the last part of the semicircular cam 49. During the first half revolution of the engine shaft 15, the first quarter revolution of the valve cam shaft 29 and the first quarter revolution of the auxiliary cam shaft 47 the said cams and crank 16 move the valves and pistons into their second cycle or phase shown in Fig. 6 where both pistons are at bottom center and both valves closed, both cylinders 13 and 35 filled with a charge of fuel and completed the intake phase of piston movement. During the next 160 degrees of engine shaft revolution and 80 degrees of revolution of the two cam shafts the third or compression phase is nearly completed. During the greater part of this period the main piston moved upward with the changing rate of advance characteristic of crank-driven reciprocation when, after the major piston travel upward had been attained without having raised the pressure of the charge to a firing temperature due to the capacity for charge of the auxiliary piston, the auxiliary piston is suddenly forced to the top of its stroke from the bottom thereof, by the cam surface 51, and firing temperature is produced by the extremely rapid compression due to the relatively rapid auxiliary piston movement at the end of the upward movement of the main piston. Thus the charge is fired and the firing is timed by the auxiliary piston under conditions precluding firing by the main piston if operating alone, which is one of the objects sought. Following the compression movement and the firing of the charge the phase of piston locations and valve positions are shown in Fig. 7 where both pistons are at top center, nearly, and both valves are closed. Here it is clearly shown that auxiliary piston 38 is bearing through intervening connections on a point of the cam disc 48 where it is being rapidly lifted to its top limit where the piston 38 will be retained by the cam surface 49 for the next 180 degrees of cam shaft revolution. At the assumed moment of firing the crank pin 16 was in advance position about 20 degrees of revolution. Because the engine being described is intended to operate at high speeds this amount of advance for the engine crank is desirable. Figure 8 illustrates the positions of the pistons and valves at the conclusion of the work stroke. Here it is seen that the main piston has nearly completed its down stroke, the auxiliary piston is yet at top center while the intake valve is closed and the exhaust valve is open.

Thus it is clear that my auxiliary piston ultimately is responsible for firing the joint charge and supercharge, but only the main piston moves under combustion and explosion pressure to operate the engine.

Continued engine shaft revolution returns the main piston to its top center, expels the gases of combustion from the cylinders and the engine phase returns to that shown in Fig. 5.

Although I prefer to use an auxiliary piston smaller in diameter than the main piston, it is apparent that by using a relatively larger piston with a relatively shorter stroke the eccentricity of the cam required to operate the same would be relatively less.

In Diesel engines of the well known types the volume of the fuel charge is limited to the constant capacity of the compression chamber added to the capacity of the variable operative length of the engine cylinder. But my auxiliary cylinder provides desired additional capacity for the fuel charge and my cam-driven auxiliary piston suddenly compresses the charge previously contained in both cylinders into the combustion and firing chamber thus firing the same.

Having thus disclosed my invention, what I claim as new therein and desire to secure by Letters Patent is,—

1. An engine of the kind described including, an engine shaft and crank thereon mounted for revolution, a compression and firing chamber, a main engine cylinder having a fully-open outer end connected conduit-wise with the said compression and firing chamber providing for equal gas pressures throughout the said compression chamber and main engine cylinder continuously during engine operation, a main engine piston mounted in the said main cylinder for reciprocation, a connecting rod joining the said main piston and the said shaft crank, an auxiliary cylinder having a fully-open outer end connected conduit-wise with the said compression and firing chamber providing for equal gas pressures throughout the said compression chamber and auxiliary cylinder continuously during engine operation, an auxiliary piston mounted for reciprocation in the said auxiliary cylinder, a compression spring connected with the said auxiliary piston for being compressed by the engine shaft during the compression and firing stroke of the auxiliary piston to react and tend to force a charging stroke of the said auxiliary piston simultaneously with the charging stroke of the said main piston to store a mixed charge of fuel and air in the said cylinders and compression and firing chamber, and mechanical means operable by the said engine shaft causing a compression and firing stroke of the said auxiliary piston during the latter part of the compression stroke of the said main piston.

2. An engine of the kind described including, an engine shaft and crank thereon mounted for revolution, a compression chamber, a main engine cylinder having an open outer end connected conduit-wise with the said compression chamber providing for equal gas pressures throughout the said compression chamber and main cylinder continuously during engine operation, a main engine piston mounted for reciprocation in the main cylinder, a connecting rod joining the said crank and main piston, an auxiliary cylinder having an open outer end joined conduit-wise with the compression and firing chamber providing for equal gas pressures in the compression chamber and auxiliary cylinder continuously during engine operation, an auxiliary piston mounted for reciprocation in the auxiliary cylinder, a compression spring reacting on the auxiliary piston mounted to be compressed by the engine shaft during the compression and firing stroke of the auxiliary piston, and mechanism operated by the engine shaft providing a period of pause for the auxiliary piston at its outer limit of reciprocation during the power and scavenger strokes of the main piston, releasing the said spring to tend to force the auxiliary piston through its charging stroke simultaneously with the charging stroke of the main piston, providing a period of pause for the auxiliary piston at its inner limit of reciprocation during the greater part of the compression stroke of the main piston and causing the compression and firing stroke of the auxiliary piston during the latter part of the compression stroke of the main piston.

3. An engine of the kind described including, a main cylinder and piston, an auxiliary cylinder and piston, a compression and firing chamber being joined conduit-wise with the said main and auxiliary cylinders providing for equal pressures throughout continuously during engine operation, an engine shaft connected to the main piston to be driven thereby and to drive the main piston, a compression spring connected with the engine shaft for compression thereby to cooperate with the engine shaft to alternately therewith drive the auxiliary piston with intervening periods of pause, and a carbureter connected conduit-wise with the compression and firing chamber whereby a charge of mixed air and fuel is drawn into the united chambers consisting of the compression and firing chamber, the main cylinder and the auxiliary cylinder by the simultaneous charging strokes of the main and auxiliary pistons, compressed to a sub-firing temperature by the greater part of the compression stroke of the main piston and compressed to a firing temperature by the compression and timing stroke of the auxiliary piston and the latter part of the compression stroke of the main piston.

ROBERT F. ELY, Jr.